(12) United States Patent
Shimomura

(10) Patent No.: US 9,744,814 B2
(45) Date of Patent: Aug. 29, 2017

(54) PNEUMATIC TIRE AND MANUFACTURING METHOD OF PNEUMATIC TIRE

(71) Applicant: TOYO TIRE & RUBBER CO., LTD., Osaka-shi, Osaka (JP)

(72) Inventor: Kazuo Shimomura, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 546 days.

(21) Appl. No.: 13/930,816

(22) Filed: Jun. 28, 2013

(65) Prior Publication Data

US 2014/0053961 A1    Feb. 27, 2014

(30) Foreign Application Priority Data

Aug. 24, 2012    (JP) .................................. 2012-185547

(51) Int. Cl.
*B60C 19/08*        (2006.01)
*B29D 30/60*        (2006.01)
(Continued)

(52) U.S. Cl.
CPC ............ B60C 19/084 (2013.01); B29D 30/08 (2013.01); B29D 30/60 (2013.01); B60C 19/082 (2013.01);
(Continued)

(58) Field of Classification Search
CPC .. B60C 19/082; B29D 2030/526; B29D 30/60
(Continued)

(56) References Cited

U.S. PATENT DOCUMENTS

2007/0017615 A1*  1/2007  Nobuchika ........ B29D 30/3028
                                                    152/152.1
2008/0006356 A1   1/2008  Takahashi et al.
(Continued)

FOREIGN PATENT DOCUMENTS

DE    11 2006 003 942 T5    5/2009
DE    10 2008 021 593 A1    7/2009
(Continued)

OTHER PUBLICATIONS

German Office Action dated Aug. 30, 2013, issued in German Patent Application No. 10 2013 108 887.2, w/English translation.
(Continued)

*Primary Examiner* — Michael H Wilson
*Assistant Examiner* — Kendra Ly
(74) *Attorney, Agent, or Firm* — Westerman, Hattori, Daniels & Adrian, LLP

(57) ABSTRACT

A pneumatic tire has a rubber member constructed by a rubber ribbon winding body formed by spirally winding a rubber ribbon. The rubber ribbon includes a composite rubber ribbon which is formed by a non-conductive rubber, and a conductive rubber partly covering the non-conductive rubber. The composite rubber ribbon has a flat cross sectional shape and is gradually reduced in its thickness toward both ends. The conductive rubber has a cross sectional area which is equal to or less than 3% of a cross sectional area of the composite rubber ribbon, and forms a surface in one side and a surface in the other side in both ends of the composite rubber ribbon. The composite rubber ribbons that are adjacent in the width direction are partly overlapped, and a conductive route is provided by the conductive rubber connected between the composite rubber ribbons.

2 Claims, 4 Drawing Sheets

(51) Int. Cl.
*B29D 30/08* (2006.01)
*B60C 11/00* (2006.01)
*B29D 30/52* (2006.01)

(52) U.S. Cl.
CPC ........ *B29D 2030/526* (2013.01); *B60C 19/08* (2013.01); *B60C 2011/0091* (2013.01)

(58) Field of Classification Search
USPC .......................... 152/152.1, DIG. 2; 156/117
See application file for complete search history.

(56) References Cited

U.S. PATENT DOCUMENTS

| | | | |
|---|---|---|---|
| 2009/0173419 A1* | 7/2009 | Kawakami | B29D 30/60 152/152.1 |
| 2009/0320985 A1* | 12/2009 | Kudo | B29D 30/3028 152/533 |
| 2010/0006194 A1* | 1/2010 | Asayama | B29D 30/60 152/152.1 |
| 2010/0012242 A1 | 1/2010 | Kudo et al. | |
| 2012/0152419 A1* | 6/2012 | Deguchi | B60C 19/08 152/152.1 |
| 2012/0205020 A1 | 8/2012 | Kawakami | |
| 2013/0133811 A1* | 5/2013 | Inoue | B29D 30/08 156/117 |

FOREIGN PATENT DOCUMENTS

| | | |
|---|---|---|
| EP | 2 487 051 A1 | 8/2012 |
| JP | 11-227415 A | 8/1999 |
| JP | 2007-8388 A | 1/2007 |
| JP | 2008-13000 A | 1/2008 |
| JP | 2009-161070 A | 7/2009 |
| WO | 2008-026337 A1 | 3/2008 |

OTHER PUBLICATIONS

Office Action dated Jun. 30, 2015, issued in counterpart Chinese Patent Application No. 201310353677.9, with English translation (15 pages).

Office Action dated May 6, 2016, issued in counterpart Japanese Patent Application No. 2012-185547, with English translation. (8 pages).

Office Action dated Feb. 29, 2016, issued in counterpart Chinese Patent Application No. 201310353677, with English translation. (19 pages).

* cited by examiner

PNEUMATIC TIRE AND MANUFACTURING METHOD OF PNEUMATIC TIRE

BACKGROUND OF THE INVENTION

Field of the Invention

The present invention relates to a pneumatic tire which can discharge static electricity generated in a vehicle body or the tire, and a manufacturing method of the pneumatic tire.

Description of the Related Art

In recent years, there have been proposed a pneumatic tire including a tread rubber blended with silica at a high ratio in order to reduce the rolling resistance that largely affects the fuel consumption of a vehicle and to increase braking performance on a wet road surface. However, compared to a tread rubber blended with carbon black at a high ratio, the electric resistance of such tread rubber is high, and accordingly, static charge generated on a vehicle body or the tire is prevented from being released to the road surface. As a result, problems like radio noises tend to occur.

Accordingly, there has been developed a pneumatic tire structured such that an electrical conduction performance can be achieved by partly arranging a conductive rubber blended with a carbon black in a tread rubber constructed by a non-conductive rubber blended with a silica so as to set a conductive route. Without being limited to the tread rubber, the other rubber members for the tire such as a side wall rubber can be formed by the non-conductive rubber. In such case, the conductive route is provided in the rubber member.

Further, there has been known a so-called ribbon winding construction method of forming a rubber ribbon winding body by continuously feeding an uncured rubber ribbon to a wound body such as a forming drum and spirally winding the rubber ribbon. According to the ribbon winding construction method, various cross sectional shapes can be easily formed by appropriately adjusting a winding condition. In addition, the rubber member constructed by the rubber ribbon winding body does not have any joint portion which generates a great step, and is more excellent in a uniformity in comparison with a rubber member which is formed by integrally extruding.

The ribbon winding construction method can be utilized for forming the rubber member having the conductive route mentioned above, for example, as shown in Patent Documents 1-3. However, in the case that an amount of the conductive rubber is reduced for enhancing an effect of lowering a rolling resistance, connection of the conductive rubber becomes insufficient in a ribbon interface, in the winding operation which partly overlaps the rubber ribbons, which are adjacent in a width direction, with each other and connects the conductive rubber between them, so that the conductive route tends to be disconnected. Further, since the disconnection in the ribbon interface is continued along a tire circumferential direction, there has been a risk that the disconnection is an obstacle to the electrical conduction performance.

PRIOR ART DOCUMENTS

Patent Document 1: Japanese Unexamined Patent Publication No. 11-227415
Patent Document 2: Japanese Unexamined Patent Publication No. 2007-8388
Patent Document 3: Japanese Unexamined Patent Publication No. 2008-13000

SUMMARY OF THE INVENTION

The present invention is made by taking the actual condition mentioned above into consideration, and an object of the present invention is to provide a pneumatic tire which can well secure an electrical conduction performance while employing a ribbon winding construction method, and a manufacturing method of the pneumatic tire.

The object can be achieved by the following present invention. That is, the present invention provides a pneumatic tire having a rubber member constructed by a rubber ribbon winding body which is formed by spirally winding a rubber ribbon, wherein the rubber ribbon includes a composite rubber ribbon which is formed by a non-conductive rubber, and a conductive rubber partly covering the non-conductive rubber; wherein the composite rubber ribbon has a flat cross sectional shape which is smaller in its thickness than its width, and is gradually reduced in its thickness toward both ends in a width direction thereof; wherein the conductive rubber has a cross sectional area which is equal to or less than 3% of a cross sectional area of the composite rubber ribbon, and forms a surface in one side and a surface in the other side in both ends of the composite rubber ribbon so as to prevent the non-conductive rubber from being exposed on both ends of the composite rubber ribbon; and wherein the rubber member is structured such that the composite rubber ribbons that are adjacent in the width direction are partly overlapped, and a conductive route is provided by the conductive rubber which is connected between the composite rubber ribbons.

The tire has the rubber member which is constructed by the rubber ribbon winding body, and the rubber ribbon includes the composite rubber ribbon which is formed by the non-conductive rubber and the conductive rubber. The rubber member is provided with the conductive route for discharging the static electricity by the conductive rubber, and the electrical conduction performance can be achieved while employing the ribbon winding construction method. Since the cross sectional area of the conductive rubber is 3% or less of the cross sectional area of the composite rubber ribbon, a rate of the conductive rubber in the composite rubber ribbon is small. Therefore, an advantageous effect (for example, an effect of lowering the rolling resistance) by the non-conductive rubber can be well obtained.

The composite rubber ribbon has the flat cross sectional shape which is gradually smaller in its thickness toward the both ends in the width direction, and is suitable for winding the composite rubber ribbons that are adjacent in the width direction while partly overlapping the rubber ribbons. The conductive rubber forms the one side surface and the other side surface in the both ends so as to prevent the non-conductive rubber from exposing on the both ends of the composite rubber ribbon. Therefore, the disconnection of the conductive route in the ribbon interface can be prevented by appropriately connecting the conductive rubber between the composite rubber ribbons that are adjacent in the width direction, and it is possible to well secure the electrical conduction performance.

In the pneumatic tire in accordance with the present invention, it is preferable that the conductive rubber is provided with a thin portion which extends in the width direction between both ends of the composite rubber ribbon, and a thick portion which is greater in its thickness than the thin portion and forms a full thickness in both ends of the composite rubber ribbon. Therefore, it is possible to appropriately connect the conductive rubber between the composite rubber ribbons that are adjacent in the width direction by enlarging the thickness of the conductive rubber in the both ends of the composite rubber ribbon.

In the pneumatic tire in accordance with the present invention, it is preferable that the conductive rubber forms a surface which is equal to or less than 60% of an outer peripheral length in a cross section of the composite rubber ribbon. Therefore, since the conductive rubber included in the composite rubber ribbon is further reduced, the advantageous effect (for example, the effect of lowering the rolling resistance) by the non-conductive rubber can be well obtained.

Further, the present invention provides a manufacturing method of a pneumatic tire for manufacturing the pneumatic tire by using a rubber member which is constructed by a rubber ribbon winding body formed by spirally winding a rubber ribbon, the method comprising: a step of feeding a composite rubber ribbon which is formed by a non-conductive rubber, and a conductive rubber partly covering the non-conductive rubber to a wound body; and a step of winding the composite rubber ribbon around the wound body so as to form the rubber ribbon winding body that is to be the rubber member, wherein the composite rubber ribbon has a flat cross sectional shape which is smaller in its thickness than its width, and is gradually reduced in its thickness toward both ends in a width direction thereof, wherein the conductive rubber has a cross sectional area which is equal to or less than 3% of a cross sectional area of the composite rubber ribbon, and forms a surface in one side and a surface in the other side in both ends of the composite rubber ribbon so as to prevent the non-conductive rubber from being exposed on both ends of the composite rubber ribbon; and wherein the composite rubber ribbons that are adjacent in the width direction are partly overlapped, and a conductive route is provided by the conductive rubber which is connected between the composite rubber ribbons, in the stage of forming the rubber ribbon winding body.

The method has the stage of forming the rubber ribbon winding body which comes to the rubber member, and the rubber ribbon includes the composite rubber ribbon which is formed by the non-conductive rubber and the conductive rubber. The rubber member is provided with the conductive route for discharging the static electricity by the conductive rubber, and the electrical conduction performance can be achieved while employing the ribbon winding construction method. Since the cross sectional area of the conductive rubber is 3% or less of the cross sectional area of the composite rubber ribbon, a rate of the conductive rubber in the composite rubber ribbon is small. Therefore, an advantageous effect (for example, an effect of lowering the rolling resistance) by the non-conductive rubber can be well obtained.

The composite rubber ribbon has the flat cross sectional shape which is gradually smaller in its thickness toward the both ends in the width direction, and is suitable for winding the composite rubber ribbons that are adjacent in the width direction while partly overlapping the rubber ribbons. The conductive rubber forms the one side surface and the other side surface in the both ends so as to prevent the non-conductive rubber from exposing on the both ends of the composite rubber ribbon. Therefore, the disconnection of the conductive route in the ribbon interface can be prevented by appropriately connecting the conductive rubber between the composite rubber ribbons that are adjacent in the width direction, and it is possible to well secure the electrical conduction performance.

In the manufacturing method of a pneumatic tire in accordance with the present invention, it is preferable that the conductive rubber is provided with a thin portion which extends in the width direction between both ends of the composite rubber ribbon, and a thick portion which is greater in its thickness than the thin portion and forms a full thickness in both ends of the composite rubber ribbon. Therefore, it is possible to appropriately connect the conductive rubber between the composite rubber ribbons that are adjacent in the width direction by enlarging the thickness of the conductive rubber in the both ends of the composite rubber ribbon.

In the manufacturing method of a pneumatic tire in accordance with the present invention, it is preferable that the conductive rubber forms a surface which is equal to or less than 60% of an outer peripheral length in a cross section of the composite rubber ribbon. Therefore, since the conductive rubber included in the composite rubber ribbon is further reduced, the advantageous effect (for example, the effect of lowering the rolling resistance) by the non-conductive rubber can be well obtained.

DETAILED DESCRIPTION OF THE PREFERRED EMBODIMENTS

An embodiment of the present invention will be explained with reference to the drawings.

Figure 1:
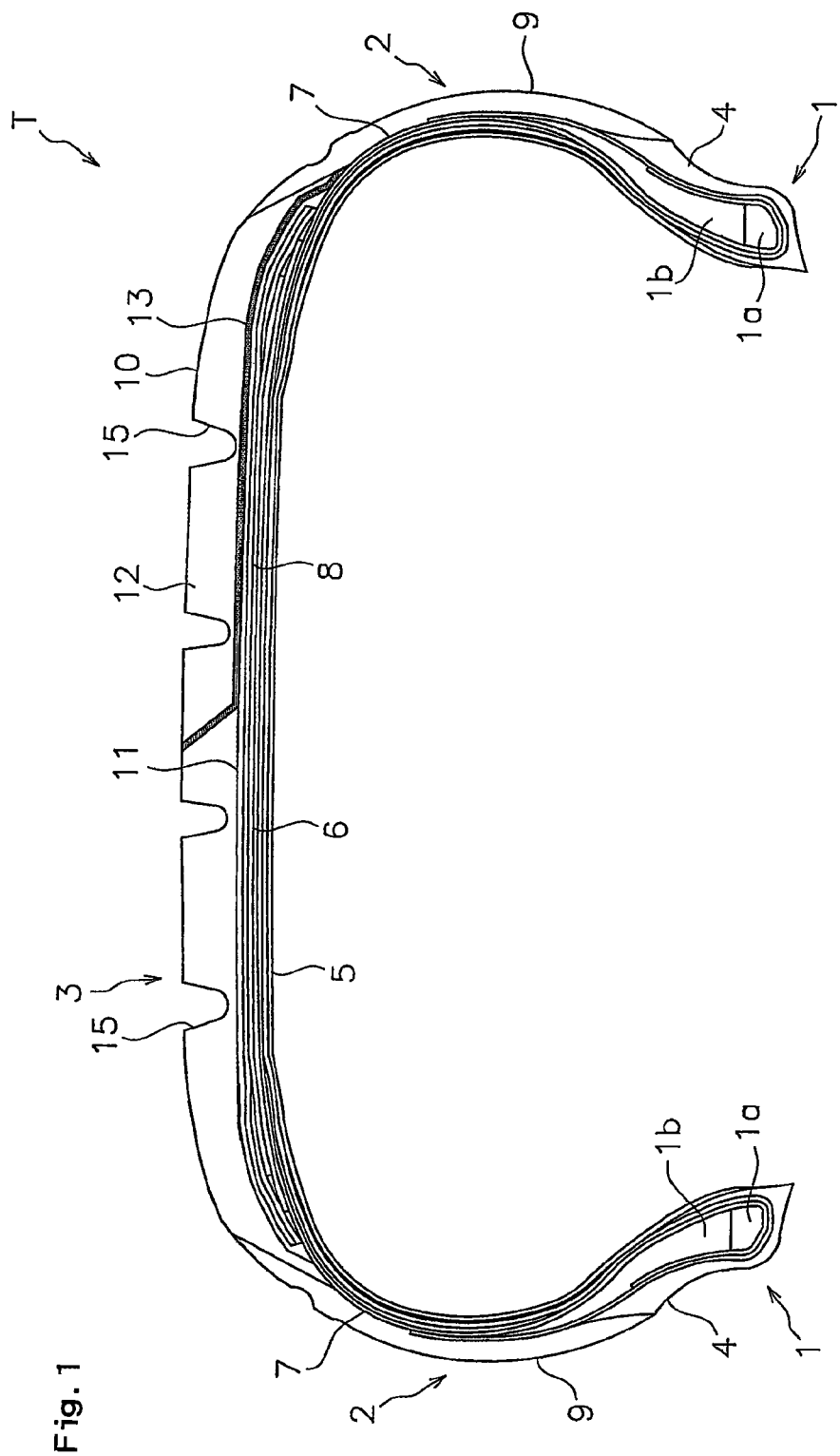
FIG. 1 is a sectional view of a tire meridian showing one example of a pneumatic tire according to the present invention.

A pneumatic tire T shown in FIG. 1 is provided with a pair of bead portions 1, side wall portions 2 which extend to an outer side in a tire diametrical direction from the respective bead portions 1, a tread portion 3 which is connected to outer ends in the tire diametrical direction of each of the side wall portions 2, and toroidal carcass layer 7 which is provided between a pair of bead portions 1. The bead portion 1 includes an annular bead core 1a composed of a bundle of steel wires or the like sheathed with rubber and a bead filler 1b made of hard rubber.

The carcass layer 7 is constructed by at least one (two in the present embodiment) carcass ply, and is locked in a state in which an end portion thereof is wound up via a bead core 1a. The carcass ply is formed by coating a cord which extends at an angle of approximately 90 degree with respect to a tire circumferential direction by a topping rubber. An inner liner rubber 5 for retaining a pneumatic pressure is arranged in an inner side of the carcass layer 7.

Further, the tire T is provided with rim strip rubbers 4 which are provided in outer sides of the carcass layer 7 at the bead portions 1, and can come into contact with a rim (not shown), side wall rubbers 9 which are provided in the outer sides of the carcass layer 7 at the side wall portion 2, and a tread rubber 10 which is provided in the outer sides of the carcass layer 7 at the tread portion 3. In the present embodiment, the topping rubber of the carcass layer 7 (topping rubber of carcass ply) and the rim strip rubbers 4 are formed by a conductive rubber, and the side wall rubbers 9 are formed by a non-conductive rubber.

In an inner side in the tire diametrical direction of the tread rubber 10, there are provided a belt layer 6 which is constructed by a plurality of (two in the present embodiment) belt plies, and a belt reinforcing layer 8 which is constructed by covering a cord extending substantially in a tire circumferential direction with a topping rubber. Each of the belt plies is formed by coating a cord extending while inclining with respect to the tire circumferential direction with a topping rubber, and is laminated in such a manner that the cord intersects inversely to each other between the plies. The belt reinforcing layer 8 may be omitted as occasion demands.

Figure 2:
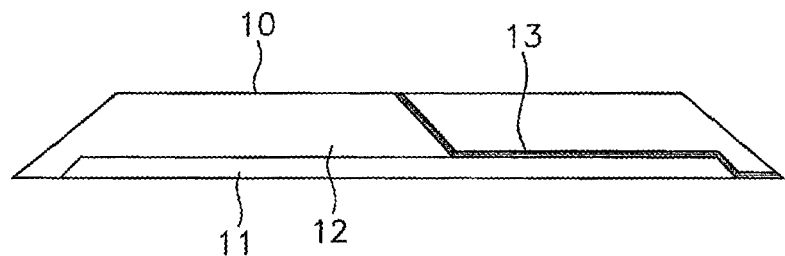
FIG. 2 is a cross sectional view schematically showing the tread rubber before a cure forming.

FIG. 2 schematically shows the tread rubber 10 before cure forming. The tread rubber 10 has a cap portion 12 which is formed by the non-conductive rubber and constructs a ground-contacting surface, a base portion 11 which is formed by the non-conductive rubber and is provided in an inner side in the tire diametrical direction of the cap portion 12, and a conductive portion 13 which is formed by the conductive rubber. The conductive portion 13 continuously extends from one end which is exposed to an outer peripheral surface of the cap portion 12 to the other end which reaches an inner peripheral surface of the cap portion 12, and is formed as an L-shape in a cross section. In order to achieve an easy discrimination on the drawings, the conductive portion 13 is colored by dark in FIG. 1 and the like.

The conductive rubber means a rubber in which a volume resistivity at room temperature (20° C.) is less than $10^8$ Ω·cm, and is manufactured, for example, by blending a raw material rubber with a carbon black as a reinforcing agent at a high rate. The carbon black is blended, for example, at 30 to 100 parts by weight in relation to 100 parts by weight of rubber component. The conductive rubber can be obtained by blending a known conductivity applying material such as a carbon including a carbon fiber, a graphite and the like, or a metal including a metal powder, a metal oxide, a metal flake, a metal fiber and the like other than the carbon black.

The non-conductive rubber means a rubber in which a volume resistivity at room temperature (20° C.) is equal to or more than $10^8$ Ω·cm, and is manufactured, for example, by blending a raw material rubber with a silica as a reinforcing agent at a high rate. The silica is blended, for example, at 30 to 100 parts by weight in relation to 100 parts by weight of rubber component. As the silica, a wet type silica can be preferably employed, however, any material which is generally used as a reinforcing material can be used without limitation. The non-conductive rubber may be produced by blending a calcined clay, a hard clay, a calcium carbonate or the like in addition to the silica such as a precipitated silica, a silicic anhydride or the like.

Further, it is possible to employ a material which does not include any silica or is blended with the silica at a low rate as the reinforcing agent blended in the raw material rubber, and mainly includes a highly dispersed carbon black, for the non-conductive rubber. The non-conductive rubber is effective for securing a rigidity in addition to suppression of an increase in rolling resistance. Therefore, the non-conductive rubber can enhance a steering stability while securing a rigidity of a tire sideward portion by being applied to the side wall rubber 9 and the topping rubber of the carcass ply.

As for the raw material rubber mentioned above, the following are exemplified; i.e., natural rubber, styrene-butadiene rubber (SBR), butadiene rubber (BR), isoprene rubber (IR), butyl rubber (IIR) and the like. These materials may be used alone or in combination. The above raw rubber is appropriately blended with a curing agent, a cure accelerator, a plasticizer, an antioxidant and the like.

The tread rubber 10 is provided with a conductive route reaching into the carcass layer 7 from the ground-contacting surface by the conductive portion 13. The conductive portion 13 extends to an inner side in the tire diametrical direction from the ground-contacting surface so as to reach an outer peripheral surface of the base portion 11, and extends to one side to right side in FIG. 1) in the tire width direction between the cap portion 12 and the base portion 11 so as to be connected to the carcass layer 7. A static electricity generated in the vehicle body and the tire is discharged to a road surface from the rim via the rim strip rubbers 4, the carcass layer 7 and the conductive portion 13. Therefore, the topping rubbers of the belt layer 6 and the belt reinforcing layer 8 maybe constructed by the non-conductive rubber.

Next, a description will be given of a method of manufacturing the pneumatic tire T. Since the pneumatic tire T can be manufactured in the same manner as the conventional tire manufacturing step except a point relating to the tread rubber 10, a description will be given mainly of a forming step of the tread rubber.

Figure 3:
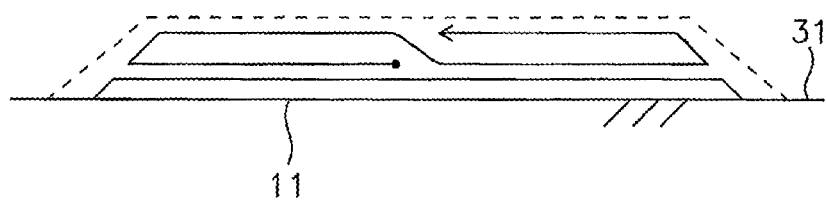
FIG. 3 is a conceptual view showing a moving route of a winding position of a rubber ribbon.

The tread rubber 10 is formed by forming the base portion 11 and thereafter forming the cap portion 12 according to a ribbon winding construction method. The ribbon winding construction method is a construction method of spirally winding an uncured rubber ribbon having a small width along the tire circumferential direction and forming a rubber member having a desired cross sectional shape. Therefore, the cap portion 12 is constructed by a rubber ribbon winding body which is formed by spirally winding the rubber ribbon. FIG. 3 conceptually shows an example of a moving route of a winding position of the rubber ribbon, and the rubber ribbon is wound along a route formed as a transverse shape of the numeral eight.

Figure 4:
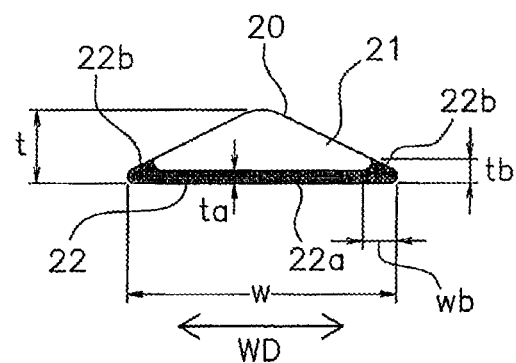
FIG. 4 is a cross sectional view of a composite rubber ribbon.
Figure 5:
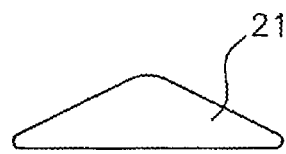
FIG. 5 is a cross sectional view of the rubber ribbon.

The rubber ribbon used for forming the cap portion 12 includes a composite rubber ribbon 20 which is formed by a non-conductive rubber 21, and a conductive rubber 22 partly covering the non-conductive rubber 21, as shown in FIG. 4. The rubber ribbon 20 in FIG. 4 is a double laminated rubber ribbon of the non-conductive rubber 21 and the conductive rubber 22, however, is constructed by a single layered rubber ribbon which is formed only by the non-conductive rubber 21 as shown in FIG. 5 as occasion demands.

Figure 6:
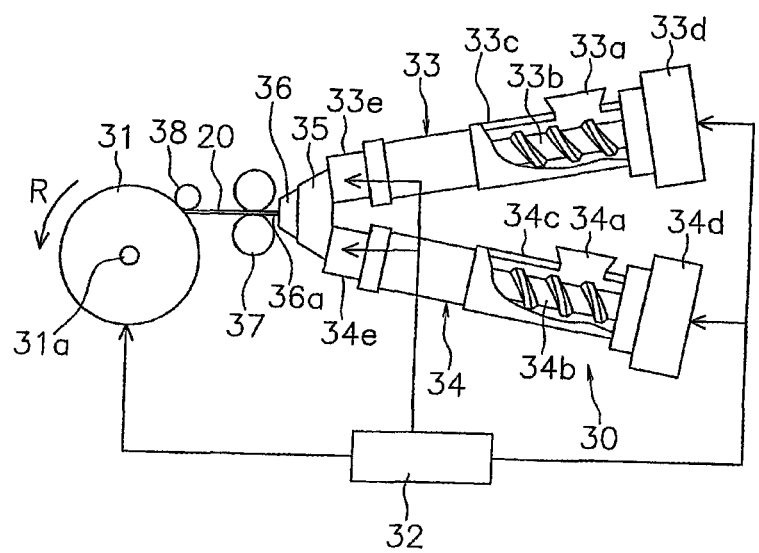
FIG. 6 is a view of an outline structure of a manufacturing equipment for carrying out a winding of a rubber ribbon.

The forming and the winding of the rubber ribbon 20 can be carried out by using an equipment as exemplified in FIG. 6. This equipment is provided with a rubber ribbon supply apparatus 30 which can form a double-layered rubber ribbon 20 by co-extruding two kinds of rubbers, a rotational support body 31 as a wound body around which the rubber ribbon 20 supplied from the rubber ribbon supply apparatus 30 is wound, and a control apparatus 32 which carries out an actuation control of the rubber ribbon supply apparatus 30 and the rotational support body 31. The rotational support body 31 is structured such that it can rotate in a direction R around an axis 31a and move in an axial direction.

An extruding machine 33 is provided with a hopper 33a, a screw 33b, a barrel 33c, a drive apparatus 33d of the screw 33b, and a head portion 33e having a gear pump built-in. In the same manner, an extruding machine 34 is provided with a hopper 34a, a screw 34b, a barrel 34c, a drive apparatus 34d and a head portion 34e. A rubber combining portion 35 additionally provided with a die 36 is provided in leading ends of a pair of extruding machines 33 and 34.

If the nonconductive rubber corresponding to the rubber material is introduced in the hopper 33a, and the conductive rubber corresponding to the rubber material is introduced in the hopper 34a, the respective rubbers are fed out forward while being mixed by the screws 33b and 34b, passed by the head portion 33e and 34e, combined in a predetermined shape at the rubber combining portion 35, and extruded as the double-layered rubber ribbon 20 from a discharge port 36a. The formed rubber ribbon 20 is fed out forward by a roll 37, and is wound around the rotational support body 31 while being pressed by a roller 38.

If the extrusion of the conductive rubber is stopped by inhibiting a rotation of a gear pump within a head portion 34e, and inhibiting a rotation of a screw 34b as occasion demands, at a time of forming the rubber ribbon 20, the rubber ribbon formed as a single layer of the nonconductive rubber 21 can be obtained as shown in FIG. 5. The actuation of the gear pump within the head portion 34e and the screw 34b as mentioned above is controlled by the control apparatus 32, and it is possible to freely carry out a switching between the single layer and the double layer of the rubber ribbon.

FIG. 4 shows a cross section at a time of cutting the composite rubber ribbon 20 by a plane which is vertical to a longitudinal direction. The composite rubber ribbon 20 has a flat cross sectional shape which is smaller in its thickness in comparison with its width, and gradually reduced in its thickness toward both ends in a width direction WD thereof. The cross sectional shape mentioned above is suitable for partly overlapping and winding the composite rubber ribbons that are adjacent in the width direction. A maximum width w of the composite rubber ribbon 20 is preferably between 14 and 36 mm, and a maximum thickness t is preferably between 1.0 and 3.6 mm. The cross section of the rubber ribbon 20 is not limited to a triangle shape, but may employ the other shapes, for example, an oval shape, a rhombic shape and the like.

The conductive rubber 22 has a cross sectional area which is equal to or less than 3% of a cross sectional area of the composite rubber ribbon 20. Accordingly, since a rate of the conductive rubber 22 in the composite rubber ribbon 20 becomes small, an advantageous effect by the non-conductive rubber 21 (for example, the effect of lowering the rolling resistance) can be well obtained. The cross sectional area rate is preferably less than 3%, and is further preferably equal to or less than 2%. Further, the cross sectional area rate is preferably equal to or more than 1% for appropriately setting the conductive route.

The conductive rubber 22 forms a surface in one side (a lower side in FIG. 4) and a surface in the other side (an upper side in FIG. 4) in both ends of the composite rubber ribbon 20, so as to prevent the non-conductive rubber 21 from exposing on both ends of the composite rubber ribbon 20. Accordingly, in a winding operation of the composite rubber ribbon 20 which is in detail mentioned later, the conductive rubber 22 can be appropriately connected between the composite rubber ribbons 20 that are adjacent in the width direction. As a result, it is possible to prevent the conductive route from being disconnected in the ribbon interface, thereby well securing the electrical conduction performance.

In the present embodiment, the conductive rubber 22 is provided with a thin portion 22a which extends in the width direction between both ends of the composite rubber ribbon 20, and a thick portion 22b which is greater in its thickness than the thin portion 22a and form a full thickness of both ends of the composite rubber ribbon 20. A thickness to of the thin portion 22a is, for example, between 0.04 and 0.20 mm, and a maximum thickness tb of the thick portion 22b is, for example, between 0.1 and 0.5 mm. A width wb of the thick portion 22b is, for example, between 5 and 50% of the maximum width w of the composite rubber ribbon 20, preferably between 5 and 20% thereof. Thin portion 22a is continued in the width direction so as to couple a pair of thick portions 22b, and the thick portion 22b constructs both ends in the width direction of the conductive rubber 22.

A surface of the composite rubber ribbon 20 is formed by the non-conductive rubber 21 and the conductive rubber 22. At the winding time, a lower side in FIG. 4 comes to an inner peripheral side which faces to a rotation support body 31. The surface coming to the inner peripheral side of the composite rubber ribbon 20 are all covered by the conductive rubber 22. For reducing the conductive rubber 22 included in the composite rubber ribbon 20, the conductive rubber 22 preferably forms a surface which is equal to or less than 60% of an outer peripheral length in a cross section of the composite rubber ribbon 20. Further, for appropriately setting the conductive route, the conductive rubber 22 preferably forms a surface which is equal to or more than 50% of the outer peripheral length.

When the tread rubber 10 is formed, the base portion 11 is firstly formed on an outer peripheral surface of the rotation support body 31 by the non-conductive rubber 21. Although not shown in FIG. 3, the belt layer 6 and the belt reinforcing layer 8 are previously provided on the outer peripheral surface of the rotation support body 31, and the base portion 11 is formed on them. The formation of the base portion 11 may utilize any of an extrusion forming method and a ribbon winding construction method. The extrusion forming method is a construction method of extrusion forming an uncured band-like rubber member having a desired cross sectional shape and jointing end portions to each other so as to form an annular shape.

Subsequently, after forming the base portion 11, the rubber ribbon is wound around an outer periphery along a route in FIG. 3, and the cap portion 12 is formed. At this time, the conductive rubber 22 is partly provided in the rubber ribbon under being wound, and the composite rubber ribbon 20 is fed to the rotation support body 31 as the wound body. Further, the composite rubber ribbon 20 is wound around the wound body, and the rubber ribbon winding body coming to the cap portion 12 is formed. In a stage of forming the rubber ribbon winding body, the composite rubber ribbons 20 that are adjacent in the width direction are partly overlapped, and the conductive route is provided by the conductive rubber 22 which is connected therebetween.

Figure 7:
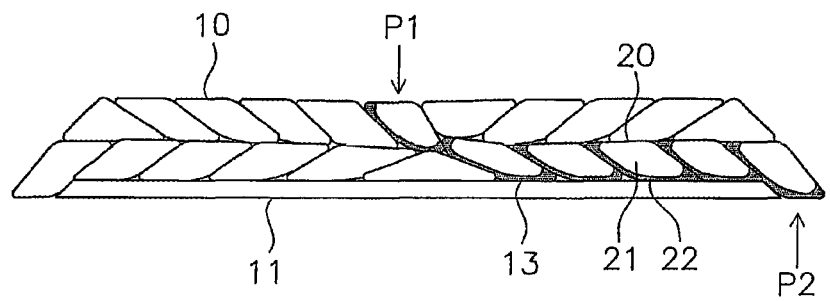
FIG. 7 is a cross sectional view of the tread rubber.

Specifically, as shown in FIG. 7, the composite rubber ribbon 20 is wound so that the composite rubber ribbons 20 that are adjacent in the width direction are partly overlapped, and the conductive rubber 22 is connected between them. The composite rubber ribbon 20 is fed in a section from P1 to P2, and the conductive route is provided by the conductive rubber 22. P1 is a point which is exposed to the ground-contacting surface, and P2 is a point which passes through one end portion of the base portion 11. The other positions are not provided with the conductive rubber 22, and are formed by the single layer rubber ribbon shown in FIG. 5.

For securing the connection of the conductive rubber 22, the structure of the composite rubber ribbon 20 in which the surface in one side and the surface in the other side in both ends are formed by the conductive rubber 22 is advantageous, and prevents the conductive route from being disconnected on the ribbon interface so as to contribute to ensuring the electrical conduction performance. As shown in FIG. 7, the conductive portion 13 has a plurality of branch portions which are terminated halfway while being branched to the ground-contacting surface side from the portion shown in FIG. 2, in addition to the portion shown in FIG. 2, however, the description thereof is omitted in FIGS. 1 and 2. The conductive portion 13 is not limited to the structure having the branch portions.

After the forming step of the tread rubber 10, the step proceeds to a forming step of a green tire, whereby the green tire is formed by mounting the tread rubber 10 on the outer peripheral surface of the carcass layer 7 which is formed as the toroidal shape, and combining with the other tire constructing members. Thereafter, the step proceeds to a curing step of the green tire, and the pneumatic tire T shown in FIG. 1 is manufactured by applying a curing process to the green tire. The ribbon interface created by winding the composite rubber ribbon 20 can be specified in the tire cross section after the cure treatment, and can be determined on the basis of a nature of the rubber interface observed as thin in the cross section, for example, cutting the tire by a sharp cutting edge.

Figure 8:
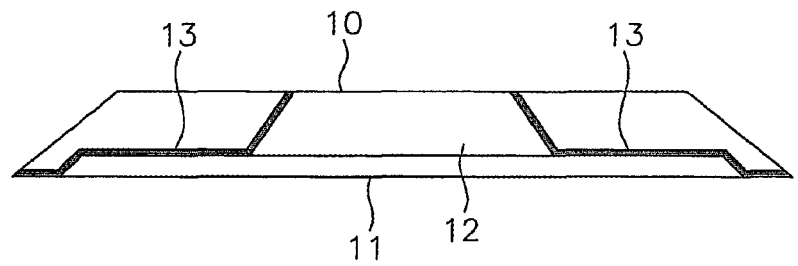
FIG. 8 is a cross sectional view conceptually showing a tread rubber in accordance with the other embodiment.
Figure 9:
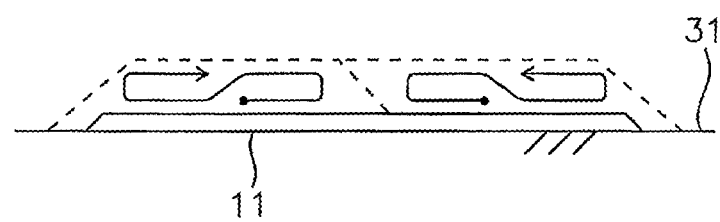
FIG. 9 is a conceptual view showing a moving route of a winding position of a rubber ribbon according to the other embodiment.

As long as a necessary conductive route is provided in the tread rubber 10, the shape of the conductive portion 13 is not particularly limited. For example, a cap portion 12 having a pair of conductive portions 13 as shown in FIG. 8 may be formed by winding a rubber ribbon as shown in FIG. 9.

The conductive route constructed by the conductive portion 13 is not limited to the conductive route which passes through the cap portion 12 so as to reach the inner peripheral surface from the outer peripheral surface, but may employ, for example, a conductive route which reaches the side surface of the tread rubber 10 from the outer peripheral surface of the cap portion 12. The conductive portion 13 exposed on the side surface of the tread rubber 10 is connected to the conductive portion which is buried in the side wall rubber 9 or connected to the side wall rubber 9 which is formed by the conductive rubber. The static electricity is discharged to the road surface from the rim via the rim strip rubber 4, (the conductive portion provided in) the side wall rubber 9, and the conductive portion 13.

In the present embodiment, there is employed a side-on tread structure in which an end portion of the side wall rubber 9 is mounted to an end portion of the tread rubber 10, however, it is possible to employ a tread-on side structure in which the end portion of the tread rubber 10 is mounted to the end portion of the side wall rubber 9, in place of this. In this case, the conductive portion 13 may be connected to the conductive portion which is buried in the side wall rubber 9, or may be connected to the side wall rubber 9 which is formed by the conductive rubber.

Figure 10:
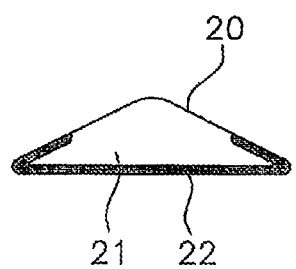
FIG. 10 is a cross sectional view of a composite rubber ribbon according to the other embodiment.
Figure 11:
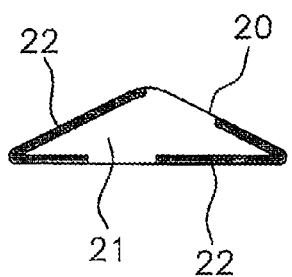
FIG. 11 is a cross sectional view of a composite rubber ribbon according to the other embodiment.

Even in the composite rubber ribbon 20 shown in FIGS. 10 and 11, it is possible to contribute to ensuring the electrical conduction performance while preventing the conductive route from being disconnected on the ribbon interface in the same manner as mentioned above. FIG. 10 is an example in which the conductive rubber 22 has a fixed thickness, and FIG. 11 is an example in which the conductive rubber 22 is interrupted at a center portion of the composite rubber ribbon 20. The amount of the conductive rubber 22 is small in both the examples, and a surface in one side and a surface in the other side in both ends of the composite rubber ribbon 20 are formed by the conductive rubber 22. The conductive rubber 22 in FIG. 11 can be provided with the thin portion and the thick portion mentioned above.

The rubber member constructed by the rubber ribbon winding body is not limited to the cap portion 12 which constructs the tread rubber 10, but maybe the other rubber members. Accordingly, for example, the side wall rubber provided with the conductive route may be formed by winding the composite rubber ribbon as mentioned above.

The present invention is not limited to the embodiment mentioned above, but can be improved and modified variously within the scope of the present invention.

EXAMPLE

An example which concretely shows the structure and effect of the present invention will be explained. An evaluation of each of performances is executed as follows.

(1) Rolling Resistance

A rolling resistance was measured according to International Standards IS028580 (JISD4234), and was evaluated by an inverse number thereof. The evaluation is carried out on by using an index number with a result of a working example 1 being set to 100, indicating that the larger the numerical value is, the more excellent the rolling resistance is.

(2) Steering Stability

The tire was installed to an actual car, and was set to a pneumatic pressure designated by the vehicle, and a steering stability was evaluated on the basis of a subjective test of a driver by executing a straight traveling and a cornering traveling. The evaluation is carried out on by using an index number with a result of the working example 1 being set to 100, indicating that the larger the numerical value is, the more excellent the steering stability is.

The cap portion was formed according to the ribbon winding construction method by using the rubber ribbon shown in FIGS. 4 and 5, and the pneumatic tire having the structure in FIG. 1 was manufactured. A size of the tire served for evaluation is 195/65R15, and a tire structure and a rubber compounding are common in each of the examples, except a cross sectional area ratio (a rate of a cross sectional area of the conductive rubber in relation to a cross sectional area of the composite rubber ribbon). Results of the evaluation are shown in Table 1.

TABLE 1

| | Cross sectional area ratio | Rolling resistance | Steering stability |
| --- | --- | --- | --- |
| Comparative example | 5% | 96 | 98 |
| Working example 1 | 3% | 100 | 100 |
| Working example 2 | 2% | 102 | 100 |
| Working example 3 | 1% | 104 | 101 |

As shown in Table 1, the working examples 1 to 3 are excellent in the rolling resistance in comparison with the comparative example, and the working examples 2 and 3 are more excellent. Further, the working examples 1 to 3 are excellent in the steering stability in comparison with the comparative example. It is thought that since the amount of the conductive rubber can be reduced, an amount of the different kinds of rubber is reduced in the cap portion having the non-conductive rubber as a main substance, and deterioration of the cornering performance can be lowered by suppressing reduction of a shear rigidity in a lateral direction.

What is claimed is:

1. A pneumatic tire having a rubber member constructed by a rubber ribbon winding body which is formed by spirally winding a rubber ribbon,
wherein the rubber ribbon includes a composite rubber ribbon which is formed by a non-conductive rubber, and a conductive rubber partly covering the non-conductive rubber;
wherein the composite rubber ribbon has a flat cross sectional shape which is smaller in its thickness than its width, and is gradually reduced in its thickness toward both ends in a width direction thereof;
wherein the conductive rubber has a cross sectional area which is equal to or less than 3% of a cross sectional area of the composite rubber ribbon, and forms a surface in one side and a surface in the other side in both ends of the composite rubber ribbon so as to prevent the non-conductive rubber from being exposed on both ends of the composite rubber ribbon; and
wherein the rubber member is structured such that the composite rubber ribbons that are adjacent in the width direction are partly overlapped,
wherein the conductive rubber forms a surface which is between 50% and 60% of an outer peripheral length in a cross section of the composite rubber ribbon;
wherein a conductive route is provided by the conductive rubber which is connected between the composite rubber ribbons;
wherein the conductive rubber is provided with a thin portion which extends in the width direction between both ends of the composite rubber ribbon, and a thick portion which is greater in its thickness than the thin portion and forms a full thickness in both ends of the composite rubber ribbon;
wherein said thin portion of said conductive rubber extends along a bottom of said composite ribbon between said thick portion at said both ends, said composite ribbon being free of said conductive rubber above said thin portion; and
wherein each end of the both ends of the composite rubber ribbon comprises a surface in one side and a surface in another side that are formed of conductive rubber.

2. A manufacturing method of a pneumatic tire for manufacturing the pneumatic tire by using a rubber member which is constructed by a rubber ribbon winding body formed by spirally winding a rubber ribbon, the method comprising:
a step of feeding a composite rubber ribbon which is formed by a non-conductive rubber, and a conductive rubber partly covering the non-conductive rubber to a wound body; and
a step of winding the composite rubber ribbon around the wound body so as to form the rubber ribbon winding body that is to be the rubber member,
wherein the composite rubber ribbon has a flat cross sectional shape which is smaller in its thickness than its width, and is gradually reduced in its thickness toward both ends in a width direction thereof,
wherein the conductive rubber has a cross sectional area which is equal to or less than 3% of a cross sectional area of the composite rubber ribbon, and forms a surface in one side and a surface in the other side in both ends of the composite rubber ribbon so as to prevent the non-conductive rubber from being exposed on both ends of the composite rubber ribbon;
wherein the conductive rubber forms a surface which is between 50% and 60% of an outer peripheral length in a cross section of the composite rubber ribbon;
wherein the composite rubber ribbons that are adjacent in the width direction are partly overlapped, and a conductive route is provided by the conductive rubber which is connected between the composite rubber ribbons, in the stage of forming the rubber ribbon winding body;
wherein the conductive rubber is provided with a thin portion which extends in the width direction between both ends of the composite rubber ribbon, and a thick portion which is greater in its thickness than the thin portion and forms a full thickness in both ends of the composite rubber ribbon;
wherein said thin portion of said conductive rubber extends along a bottom of said composite ribbon between said thick portion at said both ends, said composite ribbon being free of said conductive rubber above said thin portion; and
wherein each end of the both ends of the composite rubber ribbon comprises a surface in one side and a surface in another side that are formed of conductive rubber.

* * * * *